(12) United States Patent
Ravikumar et al.

(10) Patent No.: US 9,181,095 B2
(45) Date of Patent: Nov. 10, 2015

(54) CLAUS PLANT PREPROCESSING SYSTEMS AND METHODS FOR REMOVAL OF AMMONIA FROM CLAUS PLANT FEED GASES

(71) Applicant: FLUOR TECHNOLOGIES CORPORATION, Aliso Viejo, CA (US)

(72) Inventors: Ravi Ravikumar, Lancaster, CA (US); Paul M. Mathias, Aliso Viejo, CA (US); Paul E. Koppel, Hollywood, FL (US); Sanjiv Dabee, Aliso Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 14/329,725

(22) Filed: Jul. 11, 2014

(65) Prior Publication Data

US 2015/0014590 A1 Jan. 15, 2015

Related U.S. Application Data

(60) Provisional application No. 61/845,853, filed on Jul. 12, 2013.

(51) Int. Cl.
*C01B 17/04* (2006.01)
*B01D 53/58* (2006.01)
*B01D 53/75* (2006.01)
*C01B 25/28* (2006.01)

(52) U.S. Cl.
CPC ............. *C01B 17/0408* (2013.01); *C01B 25/28* (2013.01)

(58) Field of Classification Search
CPC C01B 17/04; C01B 17/0404; C01B 17/0452; B01D 53/58; B01D 53/75
USPC ............................................ 423/573.1, 574.1
See application file for complete search history.

(56) References Cited

U.S. PATENT DOCUMENTS

| | | | | |
|---|---|---|---|---|
| 3,911,093 A | * | 10/1975 | Sherif et al. | 423/574.1 |
| 4,514,375 A | * | 4/1985 | Laufhutte | 423/237 |
| 4,643,888 A | * | 2/1987 | Palm | 423/574.1 |
| 4,770,864 A | | 9/1988 | Fujimoto | |
| 5,853,682 A | | 12/1998 | Busson | |
| 7,258,848 B1 | | 8/2007 | Blackwell | |
| 2006/0272502 A1 | | 12/2006 | Van Grinsven et al. | |
| 2009/0191113 A1 | | 7/2009 | Higdon, III et al. | |

FOREIGN PATENT DOCUMENTS

| | | | |
|---|---|---|---|
| CA | 2226023 | | 7/1998 |
| EP | 0810683 | A1 * | 12/1997 |
| WO | 2006106289 | | 10/2006 |
| WO | 2014014619 | | 1/2014 |

* cited by examiner

*Primary Examiner* — Timothy Vanoy
(74) *Attorney, Agent, or Firm* — Fish & Tsang LLP

(57) ABSTRACT

Systems and methods for pre-treatment of acid gas are presented in which ammonium is removed from the acid gas in an absorber that is operated at significantly elevated temperature using dilute phosphoric acid. While seemingly incompatible, absorbing ammonia at high heat in the absorber will allow for production of a diammonium phosphate product that is ultra-low in residual sulfurous compounds and prevent crystallization of phosphate salts due to the increased solubility of the salts in the hot diluted solvent.

20 Claims, 1 Drawing Sheet

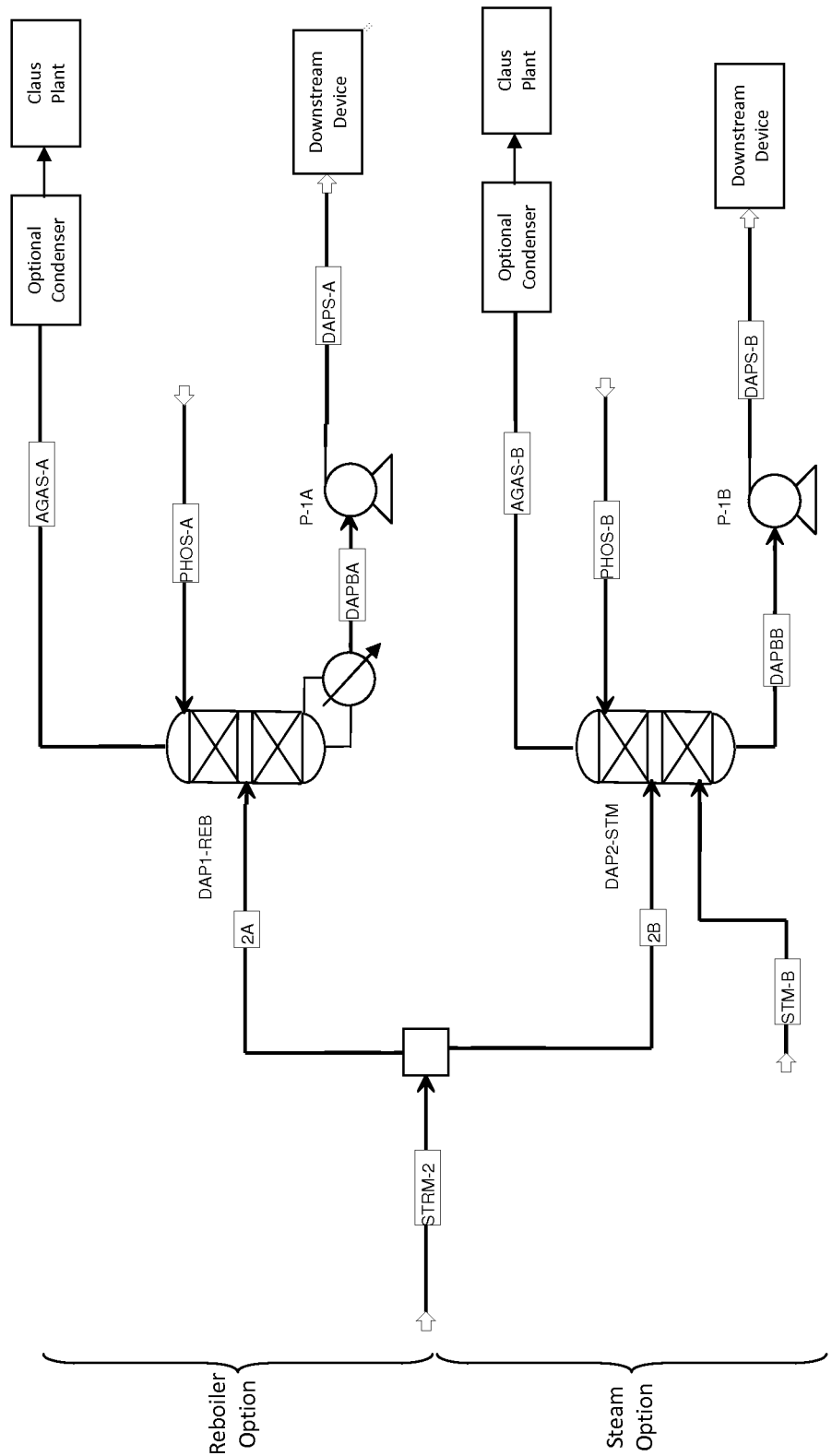

CLAUS PLANT PREPROCESSING SYSTEMS AND METHODS FOR REMOVAL OF AMMONIA FROM CLAUS PLANT FEED GASES

This application claims priority to U.S. Provisional application with the Ser. No. 61/845,853, which was filed 12 Jul. 2013.

FIELD OF THE INVENTION

The field of the invention is gas processing of feed gas to a Claus unit, and especially as it relates to processing of acid gas that has a high concentration of carbon dioxide and ammonia.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Processing of acid gases and especially of sulfur containing acid gases is well known in the art. Most typically, sulfur containing acid gases are processed to enrich the gas in hydrogen sulfide, or if concentrations are already sufficient, the sulfur containing acid gases are directly fed into a Claus plant for conversion into elemental sulfur. While the Claus reaction is at least conceptually simple and relatively easy to implement, significant limitations are present where the feed gas that has relatively high concentrations of ammonia. For example, ammonia is found next to hydrogen sulfide in relatively high concentrations in sour water stripper gases, coke vessel off gases, off gases from acid gas removal units, low-temperature gasification off gases, and/or hydroprocessing off gases.

Regardless of the particular source, Claus plants require significant modifications to cope with higher ammonia concentrations (e.g., require a modified Claus burner and/or use of oxygen enrichment for thermal decomposition). On the other hand, dedicated upstream systems may be employed that specifically deal with the excess ammonia. For example, WO2006106289 teaches combustion of ammonia and hydrogen sulfide in a single Claus thermal stage, while U.S. Pat. No. 5,853,682 teaches catalytic ammonia cracking. Unfortunately, most of these systems and methods tend to require significant modification of existing Claus plants and are thus not economically attractive. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In other attempts to deal with ammonia and hydrogen sulfide as described for example in U.S. Pat. No. 7,258,848, various systems and methods are presented in which ammonia is contacted with a concentrated acid to produce an ammonium salt solution that is then transferred to a stripper operating at relatively low temperature to remove hydrogen sulfide from therefrom before the so stripped solution is contacted with a base to obtain the corresponding crystalline ammonium salts. The remaining liquid can then be recycled to the absorption step. While such process is fairly effective in separating ammonia from hydrogen sulfide, numerous problems arise. First, due to the concentrated acid solution, precipitation of corresponding ammonium salts may occur in the absorption step, especially where the ammonia concentration is relatively high. Second, due to the stripping step, the separated hydrogen sulfide may be released in a more diluted form that may necessitate a downstream concentration step.

In another known example, US 2006/0272502, ammonia and hydrogen sulfide (and other impurities) are sequentially isolated in a process where ammonia is removed at low temperatures and elevated pressure using an aqueous acidic wash liquid while hydrogen sulfide is removed in a later step via an alkaline washing liquid. Such process not only requires substantial equipment, but also regeneration of multiple solvents, adding significant costs. Moreover, and even more disadvantageous, the processes of the '502 application are limited to a maximum concentration of ammonia of 0.6 vol %.

Therefore, even though numerous systems and methods are known on the art to process ammonia-rich acid gases, various difficulties still remain. Thus, there is still a need for improved Claus plant pre-processing systems and methods for removal of ammonia from Claus plant feed gases.

SUMMARY OF THE INVENTION

The inventive subject matter is directed to various plants, configurations, and methods for pre-treatment of an acid gas feed stream to a Claus plant where the acid gas contains appreciable quantities of ammonia. In certain embodiments, the acid gas comprises hydrogen sulfide, carbon dioxide, and ammonia, and ammonia is removed using dilute phosphoric acid (e.g., <20 mol %) to provide a treated acid gas stream that is suitable as a Claus plant feed stream and to also produce diammonium phosphate with ultra-low sulfurous compound content.

In one aspect of the inventive subject matter, the inventors contemplate a method of pre-processing a feed to a Claus plant. In such contemplated methods, an acid gas stream that comprises sulfurous compounds, optionally carbon dioxide, and ammonia is fed to an absorber in which the acid gas stream is contacted with dilute phosphoric acid to thereby form an absorber overhead product and an absorber bottom product. A heat source (e.g., reboiler or steam from a steam generator) heats the absorber such that the temperature of the absorber overhead product is at least ≥100° C. Under such conditions, the absorber bottom product contains substantially none of the sulfurous compounds of the acid gas stream and more than 50% (and more typically more than 80% or even more than 90%) of the ammonia of the acid gas stream, while the absorber overhead product contains substantially all of the sulfurous compounds of the acid gas stream and less than 50% (and more typically less than 20% or even less than 10%) of the ammonia of the acid gas stream. The so treated absorber overhead product is then fed to a Claus unit, and the absorber bottom product is fed to a downstream device (e.g., evaporator, crystallizer, solvent regenerator, optionally coupled to an ammonia fractionator or an ammonia refrigeration system).

While not limiting to the inventive subject matter, the ammonia content in the acid gas stream is typically at least 10 vol %, and/or the molar ratio of ammonia to the total sulfurous compounds is greater than 1 (and in some embodiments greater than 2 or even 3). The acid gas stream can be provided from various places, including a sour water stripper, an acid gas removal unit, a low-temperature gasification unit, or a hydroprocessing unit that is configured to receive a feedstock containing greater than 2000 ppm nitrogen.

In many cases, the dilute phosphoric acid has a concentration of equal or less than 20 mol % $H_3PO_4$, and may comprise or even be replaced with a dilute ammonium monophosphate solution, which may or may not be provided from a regeneration column or other regenerating device. Additionally, it s contemplated that the heat source will be configured such as to achieve a temperature of the absorber overhead product of ≥115° C. and a temperature of the absorber bottom product of ≥125° C. Therefore, it is also contemplated that the water may be condensed from the absorber overhead product prior to feeding the absorber overhead product to the Claus unit.

Therefore, and viewed from a different perspective, a method of pre-processing a feed to a Claus plant will include a step of contacting an acid gas stream comprising sulfurous compounds and ammonia with dilute phosphoric acid in a reboiled or steam-heated absorber at an elevated temperature, wherein the elevated temperature is effective to drive substantially all of the sulfurous compounds of the acid gas stream into an absorber overhead product and to prevent crystallization of diammonium phosphate in the absorber when more than 50% of the ammonia of the acid gas stream is in an absorber bottom product. In another step, the absorber overhead product is fed to a Claus unit while the absorber bottom product is fed to a downstream device (e.g., evaporator, crystallizer, solvent regenerator, optionally coupled to an ammonia fractionator or an ammonia refrigeration system).

As noted above, the molar ratio of ammonia to total sulfurous compounds in the acid gas stream may be greater than 1 (in some embodiments greater than 2 or even 3), and the ammonia may be present in the acid gas stream in an amount of at least 10 vol %. With respect to the elevated temperature, the inventors contemplate temperatures sufficient to achieve an absorber overhead product temperature of ≥115° C. and an absorber bottom product temperature of ≥125° C.

Consequently, in another aspect of the inventive subject matter, a Claus process pre-processing plant will include an acid gas source that produces an acid gas stream that comprises sulfurous compounds, optionally carbon dioxide, and ammonia. An absorber is fluidly coupled to the acid gas source and is configured to contact the acid gas stream with dilute phosphoric acid to form an absorber overhead product and an absorber bottom product. As noted above, the absorber is further coupled to a heat source (e.g., reboiler or steam from a steam generator) that maintains the temperature of the absorber overhead product at ≥100° C. In contemplated plants, the absorber bottom product will contain substantially none of the sulfurous compounds of the acid gas stream and more than 50% of the ammonia of the acid gas stream, while the absorber overhead product will contain substantially all of the sulfurous compounds of the acid gas stream and less than 50% of the ammonia of the acid gas stream. Typically, a Claus unit is fluidly coupled to the absorber to receive the absorber overhead product, and a downstream device (e.g., evaporator, crystallizer, solvent regenerator, optionally coupled to an ammonia fractionator or an ammonia refrigeration system) is fluidly coupled to the absorber to receive the absorber bottom product.

In certain embodiments, the acid gas source is a sour water stripper, an acid gas removal unit, a low-temperature gasification unit, or a unit comprising a hydroprocessing unit that receives a feedstock containing greater than 2000 ppm nitrogen. It is also contemplated that the heat source will maintain the temperature of the absorber overhead product at ≥115° C. and the temperature of the absorber bottom product at ≥125° C. Where desired, a condenser may be fluidly coupled between the absorber and the Claus unit to condense water from the absorber overhead product prior to feeding the absorber overhead product to the Claus unit.

Various objects, features, aspects and advantages of the inventive subject matter will become more apparent from the following detailed description of preferred embodiments, along with the accompanying drawing FIGURES in which like numerals represent like components.

BRIEF DESCRIPTION OF THE DRAWING

FIG. 1 is a schematic illustration of an exemplary Claus plant feed gas pre-treatment unit according to the inventive subject matter.

DETAILED DESCRIPTION

The inventors have discovered that ammonia-containing feed gases to a Claus plant can be effectively treated by contacting the feed gas with a reagent or solvent to remove ammonia from the feed gas. Generally, the reagent or solvent will remove at least 80%, in some aspects at least 90%, in other aspects at least 95%, and in further aspects at least 99% of the ammonia from the ammonia-containing feed gas to so produce a rich solvent/reaction product with ultra-low (e.g., equal or less than 1 ppm, equal or less than 0.1 ppm, equal or less than 0.01 ppm, or even equal or less than 1 ppb) sulfur content that can then be processed to a commodity product (e.g., diammonium phosphate, aqueous or purified ammonia, etc.), while the so treated feed gas is fed to a (typically conventional) Claus plant.

It should be especially appreciated that the systems, plants, and methods presented herein rely on two seemingly incompatible processes: absorption of a volatile compound (ammonia) in an absorber where the absorption process produces significant heat of absorption, and heating the absorber using a heat source during absorption.

Remarkably, these competing factors nevertheless afford effective removal of ammonia due to the use of diluted phosphoric acid (or diluted acidic monoammonium phosphate solution) at a temperature above the boiling point of water. In the processes and plants according to the inventive subject matter, the phosphoric acid is diluted to a degree that reduces the overall heat of absorption, while the heat in the absorber is increased to thereby increase solubility of the so formed diammonium phosphate. In most embodiments, the heat in the absorber is selected such that a significant fraction of the water from the diluted phosphoric acid leaves the absorber in the absorber overhead product and so prevents a net dilution of the solvent, which in turn facilitates effective absorption. Therefore, it should be appreciated that the configurations and methods according to the inventive subject matter are substantially distinct from conventional processes in which absorption and heat input to regenerate the solvent require separate reaction vessels (e.g., absorber and regenerator/stripper). Viewed from a different perspective, and in some aspects, the devices presented herein are effectively a combined absorber/regenerator configuration.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Moreover, where the specification claims refers to at least one of something selected from the group consisting of A, B, C . . . and N, the text should be interpreted as requiring only one element from the group, not A plus N, or B plus N, etc. Moreover, as used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In one exemplary aspect of the inventive subject matter, a low-temperature gasification unit (e.g., operating at 900-1100° C., or less) produces a syngas that is after optional shifting subjected to an acid gas removal step. In most cases, the acid gas obtained from the acid gas removal step will include significant quantities of sulfurous compounds, including hydrogen sulfide and sulfur dioxide, in addition to appreciable quantities of carbon dioxide and ammonia and further contaminants, including phenol and hydrogen cyanide. Due to the low temperature in the gasification unit, ammonia quantities will in most cases exceed the ammonia concentrations suitable for use with an unmodified Claus unit (e.g., Claus unit without burner modifications for ammonia destruction and oxygen enrichment). To remove the ammonia from the acid gas, the acid gas is fed into an absorber and contacted with dilute (e.g., equal or less than 20 mol %) phosphoric acid or ammonium monophosphate solution to so form ammonium monophosphate or ammonium diphosphate, respectively. In general, the absorber is configured and operated such that at least 50%, in some aspects at least 70%, in other aspects at least 90%, and in further aspects at least 95%, at least 99%, or at least 99.9% of the ammonia previously present in the acid gas is removed. To that end, the absorber may include appropriate internals such as packing and trays as are well known in the art. It should be appreciated that the heat of absorption in this process may be used in various downstream processes. In other aspects of the inventive subject matter, the absorber may also include a pump-around cooler to reject the heat of absorption.

Notably, the temperature in the absorber and the degree of dilution of the phosphoric acid or ammonium monophosphate solution are selected such that the heat of absorption is reduced such that (1) ammonia absorption is the prevalent process upon contact of the phosphoric acid or ammonium monophosphate solution with the ammonia in the acid gas, (2) crystallization and/or precipitation of the diammonium phosphate is reduced or even eliminated, and (3) substantially all of the sulfurous compounds from the acid feed gas are rejected into the absorber overhead product.

The so produced ammonium monophosphate and/or ammonium diphosphate may be used in numerous manners. For example, the monophosphate and/or ammonium diphosphate may be dried or granulated to so form solid product which may be sold as commodity product. Alternatively, it should be noted that the monophosphate and/or ammonium diphosphate solution may be regenerated, typically using a thermal process in which ammonia is driven off the ammonium diphosphate to form ammonium monophosphate that can then be returned to the process as lean solvent in the absorber. In that event, the regeneration of the solvent can be performed in a stripper (e.g., steam stripper) that produces an aqueous ammonia overhead product, which also may be sold as a commodity. Where desirable, water may be removed from the aqueous ammonia overhead product in an ammonia fractionator that produces an anhydrous ammonia stream as a product and water.

Alternatively, the aqueous ammonia overhead product may also be thermally integrated with an acid gas removal unit. For example, the aqueous ammonia overhead product may be pumped to pressure and subsequently separated at pressure into ammonia and water. In such case, it should be appreciated that the ammonia is already pressurized and as such can be readily condensed to form liquid ammonia, which can then be used as refrigerant via evaporation. After the ammonia has depressurized and evaporated, the ammonia can then be re-dissolved with water to either repeat the cycle or to form an aqueous ammonia product as a commodity.

FIG. 1 exemplarily and schematically illustrates two different options for systems and methods contemplated herein. More specifically, the upper portion of FIG. 1 shows Option 1 in which an absorber is reboiled, while the lower portion of FIG. 1 shows Option 2 where steam from a steam generator (not shown) is used to provide heat to the absorber. The acid gas from the acid gas source (not shown, e.g., from a sour water stripper or acid gas removal unit) is fed in to the absorber via stream STRM-2.

In Option 1 the acid gas 2A is fed to reboiled absorber DAP1-REB, where it is contacted in countercurrent manner with dilute phosphoric acid stream PHOS-A. In most aspects of the inventive subject matter, the phosphoric acid has a strength of equal or less than 20 mol %, in other aspects equal or less than 15 mol %, and in further aspects equal or less than 10 mol %, or even less. Alternatively, the phosphoric acid may also have a strength of at least 20 mol %, at least 30 mol %, at least 50 mol %, or even higher. It should still further be noted that the reboiled absorber DAP1-REB is typically operated at relative moderate to atmospheric pressure, and suitable pressure ranges will be between 0.1 and 1 atm (g), between 1 and 3 atm (g), between 3 and 5 atm (g), or even higher. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The reboiled absorber DAP1-REB produces an absorber bottom product DAPBA that is pumped by pump P-1A which is fluidly coupled to the reboiled absorber DAP1-REB. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. In most aspects of the inventive subject matter, the absorber bottom product leaves pump P-1A as product stream DAPS-A that is then fed to a suitable downstream device (e.g., crystallizer).

As shown in more detail below, it should be particularly appreciated that the absorber bottom product DAPBA and product stream DAPS-A contains substantially none of the sulfurous compounds of the acid gas stream (i.e., equal or less than 1%, in other aspects equal or less than 0.1%, is yet other aspects equal or less than 0.01% total sulfurous compounds as compared to total sulfurous compounds of the acid gas stream) and more than 50% (in some aspects at least 60%, in other aspects at least 80%, in further aspects at least 90%, or at least 99%, or at least 99.9%) of the ammonia of the acid gas stream. Similarly, the absorber overhead product AGAS-A contains substantially all of the sulfurous compounds of the acid gas stream (i.e., at least 99%, in other aspects at least 99.9%, is yet other aspects at least 99.99% total sulfurous compounds as compared to total sulfurous compounds of the acid gas stream) and less than 50% of the ammonia of the acid gas stream (in some aspects equal or less than 40%, in other aspects equal or less than 20%, in further aspects equal or less than 10%, less than 1%, or less than 0.1%). Viewed from a different perspective, the absorber overhead product need not be entirely depleted of ammonia and may therefore contain quantities of ammonia suitable for feeding into a Claus plant (e.g., may have minimum ammonia content of at least 0.1 mol %, or of at least 0.5 mol %, or of at least 1.0 mol %, or of at least 3.0 mol %, or of at least 5.0 mol %, and typically less than 10 mol %, and less than 7 mol %). The absorber overhead product AGAS-A may be fed directly to a Claus plant, or subjected to at least partial water removal (e.g., 10-25% water removal, 25-50% water removal, or 50-85% water removal) in a condenser before feeding to the Claus plant.

Similarly, in Option 2 the acid gas 2B is fed to absorber DAP2-STM together with steam STM-B that is produced by a steam source (not shown), where the acid gas 2B is contacted in countercurrent manner with dilute phosphoric acid stream PHOS-B. With respect to the remaining components in Option 2 (dilute phosphoric acid stream PHOS-B, absorber bottom product DAPBB, pump P-1B, pumped absorber bottom product DAPS-B, downstream device, absorber overhead product AGAS-B, condenser, and Claus plant), the same considerations as provided for corresponding components apply and are not reiterated here.

With respect to the temperature in the absorber or other contacting device it is generally contemplated that suitable temperatures are those that remove substantially all of the sulfurous compounds of the acid gas from the absorber bottom product (or liquid phase of the contactor). Thus, contemplated temperatures will be above 80° C. as measured at the absorber bottom, in many aspects above 100° C., and in further aspects above 110° C., in still further aspects above 120° C., in yet further aspects above 130° C. Therefore, the temperature of the absorber overhead product will be in some aspects at least 100° C., in further aspects at least 115° C., and in other aspects at least 120° C. Likewise, the temperature of the absorber bottom product will be in some aspects at least 110° C., in further aspects at least 120° C., and in other aspects at least 130° C.

In this context, it should be noted that the temperature of the absorber overhead product will in some aspects be at least or above the boiling temperature of water at the pressure at which the absorber operates. Notably, such high temperatures will allow for evaporation of water from the dilute phosphoric acid and so prevent undesirable depletion of the phosphoric acid component in the dilute solution. Consequently, it should be appreciated that no regenerator is required to concurrently operate with the absorber. However, use of a regenerator is not expressly excluded. As will be readily appreciated, the absorber temperature can be adjusted in various manners using various heat sources. For example, the absorber may be heated by a reboiler or via steam from a steam generator. However, alternative heat sources are also deemed suitable. Likewise, while most embodiments will employ an absorber (typically comprises one or more trays and/or packing) as a contacting device, various alternative devices are also deemed suitable for use herein and include including static or dynamic mixers, spargers, impellers, etc.

It is further contemplated that the nature of the acid gas that is fed to the absorber may vary considerably and that the particular composition will typically depend on the specific acid gas source. However, in most aspects of the inventive subject matter, the acid gas that is fed to the absorber will include at least 10 mol % ammonia, or at least 20 mol % ammonia, or at least 25 mol % ammonia, or at least 30 mol % ammonia, at least 35 mol % ammonia, or at least 40 mol % ammonia. Suitable acid gases fed to the absorber will also include at least 1 mol % hydrogen sulfide and other sulfurous components, or at least 3 mol % hydrogen sulfide and other sulfurous components, or at least 5 mol % hydrogen sulfide and other sulfurous components, or at least 10 mol % hydrogen sulfide and other sulfurous components, at least 15 mol % hydrogen sulfide and other sulfurous components, or at least 20 mol % hydrogen sulfide and other sulfurous components. Other sulfurous components include carbonyl sulfide, carbon disulfide, and sulfur dioxide. Additionally, the acid gas that is fed to the absorber may also include carbon dioxide in an amount of at least 5 mol %, or at least 10 mol %, or at least 15 mol %, or at least 25 mol %. Thus, contemplated systems and methods are especially useful in conjunction with various gasification and partial oxidation systems, and particularly with low-temperature gasification systems, crude oil processing plants, particularly high nitrogen content feeds hydroprocessing units with wash water systems, sour water strippers, and acid gas removal units. It should be noted that while hydrotreater and hydrocrackers will generally produce off gases with little or no carbon dioxide, such gases are still suitable for in conjunction with the teachings presented herein. Therefore, it should also be noted that next to single unit feed streams, various process streams can be combined in a plant to so form an ammonia-containing acid gas stream.

Tables 1 and 2 below illustrate exemplary calculations for simulated processes for a pre-treatment plant according to Options 1 and 2 of FIG. 1, respectively.

TABLE 1

| Stream | | 2A | PHOS-A | AGAS-A | DAPS-A |
| --- | --- | --- | --- | --- | --- |
| Phase | | Vapor | Liquid | Vapor | Liquid |
| Mole Flow | kmol/hr | 80 | 162 | 127 | 114 |
| Mass Flow | kg/hr | 1,836 | 4,802 | 2,729 | 3,909 |
| Volume Flow | m$^3$/h | 1,026 | 4 | 1,889 | 3 |
| Mole Fraction Vapor | | 1 | 0 | 1 | 0 |
| Temperature | ° C. | 100 | 66 | 122 | 131 |
| Pressure | kg/cm$^2$g | 1 | 5 | 1 | 16 |
| TOTAL STREAM Component Molar Flow | | | | | |
| H$_2$O | kmol/hr | 24 | 139 | 107 | 56 |
| NH$_3$ | kmol/hr | 35 | 0 | 0 | 35 |
| H$_3$PO$_4$ | kmol/hr | 0 | 24 | 0 | 24 |
| H$_2$S | kmol/hr | 10 | 0 | 10 | 0 |
| CO$_2$ | kmol/hr | 11 | 0 | 11 | 0 |
| HCN | kmol/hr | 0 | 0 | 0 | 0 |
| COS | kmol/hr | 0 | 0 | 0 | 0 |

TABLE 1-continued

| Stream | | 2A | PHOS-A | AGAS-A | DAPS-A |
|---|---|---|---|---|---|
| $H_2$ | kmol/hr | 0 | 0 | 0 | 0 |
| NAOH | kmol/hr | 0 | 0 | 0 | 0 |
| Component Mole Fraction | | | | | |
| $H_2O$ | mol % | 0.3020 | 0.8549 | 0.8391 | 0.4870 |
| $NH_3$ | mol % | 0.4410 | 0.0000 | 5.51E-13 | 0.3075 |
| $H_3PO_4$ | mol % | 0.0000 | 0.1451 | 0.0000 | 0.2055 |
| $H_2S$ | mol % | 0.1192 | 0.0000 | 0.0746 | 2.97E-12 |
| $CO_2$ | mol % | 0.1351 | 0.0000 | 0.0846 | 1.40E-10 |
| HCN | mol % | 0.0013 | 0.0000 | 0.0008 | 1.51E-07 |
| COS | mol % | 0.0001 | 0.0000 | 0.0001 | 2.59E-29 |
| $H_2$ | mol % | 0.0014 | 0.0000 | 0.0009 | 6.43E-29 |
| NAOH | mol % | 0.0000 | 0.0000 | 0.0000 | 0.0000 |

TABLE 2

| Stream | | 2B | PHOS-B | AGAS-B | DAPS-B | STM-B |
|---|---|---|---|---|---|---|
| Phase | | Vapor | Liquid | Vapor | Liquid | Vapor |
| Mole Flow | kmol/hr | 80 | 162 | 124 | 133 | 15 |
| Mass Flow | kg/hr | 1,836 | 4,802 | 2,664 | 4,244 | 270 |
| Volume Flow | m$^3$/h | 1,026 | 4 | 1,835 | 3 | 145 |
| Molecular Weight | | 23 | 30 | 22 | 32 | 18 |
| Mole Fraction Vapor | | 1 | 0 | 1 | 0 | 1 |
| Temperature | ° C. | 100 | 66 | 122 | 129 | 139 |
| Pressure | kg/cm$^2$g | 1 | 5 | 1 | 16 | 3 |
| TOTAL STREAM | | | | | | |
| Component Molar Flow | | | | | | |
| $H_2O$ | kmol/hr | 24 | 139 | 103 | 74 | 15 |
| $NH_3$ | kmol/hr | 35 | 0 | 0 | 35 | 0 |
| $H_3PO_4$ | kmol/hr | 0 | 24 | 0 | 24 | 0 |
| $H_2S$ | kmol/hr | 10 | 0 | 10 | 0 | 0 |
| $CO_2$ | kmol/hr | 11 | 0 | 11 | 0 | 0 |
| HCN | kmol/hr | 0 | 0 | 0 | 0 | 0 |
| COS | kmol/hr | 0 | 0 | 0 | 0 | 0 |
| $H_2$ | kmol/hr | 0 | 0 | 0 | 0 | 0 |
| NAOH | kmol/hr | 0 | 0 | 0 | 0 | 0 |
| Component Mole Fraction | | | | | | |
| $H_2O$ | | 0.3020 | 0.8549 | 0.8344 | 0.5587 | 1.0000 |
| $NH_3$ | | 0.4410 | 0.0000 | 6.44E-13 | 0.2645 | 0.0000 |
| $H_3PO_4$ | | 0.0000 | 0.1451 | 0.0000 | 0.1768 | 0.0000 |
| $H_2S$ | | 0.1192 | 0.0000 | 0.0768 | 5.58E-12 | 0.0000 |
| $CO_2$ | | 0.1351 | 0.0000 | 0.0870 | 2.17E-10 | 0.0000 |
| HCN | | 0.0013 | 0.0000 | 0.0008 | 3.45E-07 | 0.0000 |
| COS | | 0.0001 | 0.0000 | 0.0001 | 8.47E-29 | 0.0000 |
| $H_2$ | | 0.0014 | 0.0000 | 0.0009 | 2.00E-28 | 0.0000 |
| NAOH | | 0.0000 | 0.0000 | 0.0000 | 0.0000 | 0.0000 |

Therefore, it should be noted that a method of pre-processing an ammonia-containing feed gas to a Claus plant may include contacting the acid gas in an absorber with aqueous dilute phosphoric acid to thereby form an absorber overhead product and an absorber bottom product, wherein a heat source (e.g., reboiler or steam from a steam generator) heats the absorber during the absorption. In most embodiments, the heating is performed such that the temperature of the absorber overhead product is at least ≥100° C. Under such conditions, the absorber bottom product contains substantially none of the sulfurous compounds of the acid gas stream and more than 50% (and more typically more than 80% or even 90%) of the ammonia of the acid gas stream, while the absorber overhead product contains substantially all of the sulfurous compounds of the acid gas stream and less than 50% (and more typically less than 20% or even 10%) of the ammonia of the acid gas stream. The so treated absorber overhead product is then fed to a Claus unit, and the absorber bottom product is fed to a downstream device (e.g., evaporator, crystallizer, solvent regenerator, optionally coupled to an ammonia fractionator or an ammonia refrigeration system).

Thus, viewed from a different perspective, a Claus plant feed gas containing sulfurous compounds and ammonia may be pre-processed by contacting the Claus plant feed gas with dilute phosphoric acid in a reboiled or steam-heated absorber at an elevated temperature. In most aspects, the temperature is sufficient to drive substantially all of the sulfurous compounds of the acid gas stream into the absorber overhead product and to prevent crystallization of diammonium phosphate in the absorber when more than 50% of the ammonia of the acid gas stream is in an absorber bottom product. The absorber overhead product may then be fed to a Claus unit while the absorber bottom product is fed to a downstream device (e.g., evaporator, crystallizer, solvent regenerator, optionally coupled to an ammonia fractionator or an ammonia refrigeration system).

In this context, it should be noted that all methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of pre-processing a feed to a Claus plant, comprising:
    feeding an acid gas stream comprising sulfurous compounds, optionally carbon dioxide, and ammonia to an absorber, and contacting in the absorber the acid gas stream with dilute phosphoric acid to thereby form an absorber overhead product and an absorber bottom product;
    using a heat source to heat the absorber to thereby maintain a temperature of the absorber overhead product at $\geq 100°$ C.;
    wherein the absorber bottom product contains substantially none of the sulfurous compounds of the acid gas stream and more than 50% of the ammonia of the acid gas stream, and wherein the absorber overhead product contains substantially all of the sulfurous compounds of the acid gas stream and less than 50% of the ammonia of the acid gas stream;
    feeding the absorber overhead product to a Claus unit, and feeding the absorber bottom product to a downstream device.

2. The method of claim 1 wherein the ammonia is present in the acid gas stream in an amount of at least 10 vol %.

3. The method of claim 1 wherein a molar ratio of ammonia to total sulfurous compounds in the acid gas stream is greater than 1.

4. The method of claim 1 wherein the acid gas stream is provided from an acid gas source selected from the group consisting of a sour water stripper, an acid gas removal unit, and a low-temperature gasification unit, or wherein the acid gas source comprises a hydroprocessing unit that is configured to receive a feedstock containing greater than 2000 ppm nitrogen.

5. The method of claim 1 wherein the dilute phosphoric acid has a concentration of equal or less than 20 mol % $H_3PO_4$, and optionally wherein the dilute phosphoric acid is replaced with dilute ammonium monophosphate solution.

6. The method of claim 1 wherein the heat source is a reboiler or steam from a steam generator.

7. The method of claim 1 wherein the temperature of the absorber overhead product is $\geq 115°$ C. and the temperature of the absorber bottom product is $\geq 125°$ C.

8. The method of claim 1 wherein the absorber bottom product contains more than 90% of the ammonia of the acid gas stream, and wherein the absorber overhead product contains less than 10% of the ammonia of the acid gas stream.

9. The method of claim 1 further comprising a step of condensing water from the absorber overhead product prior to feeding the absorber overhead product to the Claus unit.

10. The method of claim 1 wherein the downstream device is selected from the group consisting of an evaporator, a crystallizer, and a solvent regenerator, wherein the downstream device is optionally coupled to an ammonia fractionator or an ammonia refrigeration system.

11. A method of pre-processing a feed to a Claus plant, comprising:
    contacting an acid gas stream comprising sulfurous compounds and ammonia with dilute phosphoric acid in a reboiled or steam-heated absorber at an elevated temperature;
    wherein the elevated temperature is effective to drive substantially all of the sulfurous compounds of the acid gas stream into an absorber overhead product and to prevent crystallization of diammonium phosphate in the absorber when more than 50% of the ammonia of the acid gas stream is in an absorber bottom product;
    feeding the absorber overhead product to a Claus unit, and feeding the absorber bottom product to a downstream device.

12. The method of claim 11 wherein a molar ratio of ammonia to total sulfurous compounds in the acid gas stream is greater than 1, and wherein the ammonia is present in the acid gas stream in an amount of at least 10 vol %.

13. The method of claim 11 wherein the elevated temperature is such that the temperature of the absorber overhead product is $\geq 115°$ C. and the temperature of the absorber bottom product is $\geq 125°$ C.

14. The method of claim 11 wherein the downstream device is selected from the group consisting of an evaporator, a crystallizer, and a solvent regenerator, wherein the downstream device is optionally coupled to an ammonia fractionator or an ammonia refrigeration system.

15. A Claus process pre-processing plant, comprising:
    an acid gas source configured to produce an acid gas stream that comprises sulfurous compounds, optionally carbon dioxide, and ammonia;
    an absorber fluidly coupled to the acid gas source and configured to contact the acid gas stream with dilute phosphoric acid to thereby form an absorber overhead product and an absorber bottom product;
    wherein the absorber is coupled to a heat source configured to maintain a temperature of the absorber overhead product at $\geq 100°$ C.;
    wherein the absorber bottom product contains substantially none of the sulfurous compounds of the acid gas stream and more than 50% of the ammonia of the acid gas stream, and wherein the absorber overhead product contains substantially all of the sulfurous compounds of the acid gas stream and less than 50% of the ammonia of the acid gas stream;
    a Claus unit fluidly coupled to the absorber and configured to receive the absorber overhead product; and
    a downstream device fluidly coupled to the absorber and configured to receive the absorber bottom product.

16. The plant of claim 15 wherein the acid gas source is selected from the group consisting of a sour water stripper, an acid gas removal unit, and a low-temperature gasification unit, or wherein the acid gas source comprises a hydroprocessing unit that is configured to receive a feedstock containing greater than 2000 ppm nitrogen.

17. The plant of claim 15 wherein the heat source comprises a reboiler or a steam generator that is configured to provide steam to the absorber.

18. The plant of claim 15 wherein the heat source is configured to maintain a temperature of the absorber overhead product at ≥115° C. and the temperature of the absorber bottom product at ≥125° C.

19. The plant of claim 15 further comprising a condenser fluidly coupled between the absorber and the Claus unit and configured to condense water from the absorber overhead product prior to feeding the absorber overhead product to the Claus unit.

20. The plant of claim 15 wherein the downstream device is selected from the group consisting of an evaporator, a crystallizer, and a solvent regenerator, wherein the downstream device is optionally coupled to an ammonia fractionator or an ammonia refrigeration system.

* * * * *